US012379293B2

(12) United States Patent
Wang et al.

(10) Patent No.: US 12,379,293 B2
(45) Date of Patent: Aug. 5, 2025

(54) METHOD, APPARATUS AND PROGRAM PRODUCT FOR PREDICTING MULTIAXIAL FATIGUE LIFE

(71) Applicant: HUNAN UNIVERSITY, Hunan (CN)

(72) Inventors: Xiaogang Wang, Hunan (CN); Chao Jiang, Hunan (CN); Ensheng Feng, Shandong (CN)

(73) Assignee: HUNAN UNIVERSITY, Hunan (CN)

( * ) Notice: Subject to any disclaimer, the term of this patent is extended or adjusted under 35 U.S.C. 154(b) by 545 days.

(21) Appl. No.: 17/790,999

(22) PCT Filed: Aug. 4, 2020

(86) PCT No.: PCT/CN2020/106873
§ 371 (c)(1),
(2) Date: Jul. 6, 2022

(87) PCT Pub. No.: WO2021/139150
PCT Pub. Date: Jul. 15, 2021

(65) Prior Publication Data
US 2023/0022649 A1    Jan. 26, 2023

(30) Foreign Application Priority Data
Jan. 6, 2020    (CN) .......................... 202010010728.8

(51) Int. Cl.
*G01N 3/32*    (2006.01)
(52) U.S. Cl.
CPC ....... *G01N 3/32* (2013.01); *G01N 2203/0008* (2013.01); *G01N 2203/0073* (2013.01)
(58) Field of Classification Search
CPC .......... G01N 3/32; G01N 23/20; G01N 29/14; G01N 23/2251; G01N 3/56; G01N 3/08;
(Continued)

(56) References Cited

U.S. PATENT DOCUMENTS

2002/0167988 A1    11/2002  Zhu
2010/0299085 A1*   11/2010  Slycke ................. G01M 13/04
                                                            702/42
(Continued)

FOREIGN PATENT DOCUMENTS

CN    103926152 A    7/2014
CN    104614227 A    5/2015
(Continued)

OTHER PUBLICATIONS

E.S.Feng et al., A new multiaxial fatigue model for life prediction based energy on dissipation evaluation, International Journal of Fatigue, No. 122, Jan. 9, 2019.
(Continued)

*Primary Examiner* — Brandi N Hopkins
(74) *Attorney, Agent, or Firm* — Ware, Fressola, Maguire & Barber LLP

(57) ABSTRACT

A method for predicting a multiaxial fatigue life. The method includes: obtaining a first temperature rise value of a to-be-tested material in a first cycle; determining first inherent dissipation energy of the to-be-tested material in the first cycle according to the first temperature rise value and a time constant; and determining the multiaxial fatigue life of the to-be-tested material according to a first proportional value, the first inherent dissipated energy, axial fatigue test parameters and torsional fatigue test parameters; the first proportional value is a ratio of an axial strain amplitude to a torsional strain amplitude of a multiaxial fatigue test, the axial fatigue test parameters are configured to represent an axial fatigue resistance of the to-be-tested material, and the torsional fatigue test parameters are configured to represent a torsional fatigue resistance of the to-be-tested material.

20 Claims, 10 Drawing Sheets

(58) Field of Classification Search
CPC ... G01N 2203/0008; G01N 2203/0073; G01N 3/24; G01N 17/00; G01N 3/00; G01N 25/20; G01N 3/02; G06F 30/23; G06F 30/20; G01M 13/04; G01M 5/0033; G01M 13/00; G01L 5/00
See application file for complete search history.

(56) References Cited

U.S. PATENT DOCUMENTS

| | | | |
|---|---|---|---|
| 2011/0259116 | A1 | 10/2011 | Slycke et al. |
| 2015/0053017 | A1 | 2/2015 | Khonsari et al. |
| 2018/0356324 | A1* | 12/2018 | Feng ........................ G01N 3/02 |

FOREIGN PATENT DOCUMENTS

| | | | | |
|---|---|---|---|---|
| CN | 105975766 | A | 9/2016 | |
| CN | 106202647 | A | 12/2016 | |
| CN | 106644781 | A | 5/2017 | |
| CN | 106896133 | A | 6/2017 | |
| CN | 104462834 | B | 1/2018 | |
| CN | 108491640 | A | 9/2018 | |
| CN | 108562505 | A | 9/2018 | |
| CN | 108760546 | A | 11/2018 | |
| CN | 109115479 | A | 1/2019 | |
| CN | 109408900 | A | 3/2019 | |
| CN | 110287546 | A | 9/2019 | |
| CN | 110348056 | A | 10/2019 | |
| CN | 111144044 | A | 5/2020 | |
| CN | 111323316 | A | 6/2020 | |
| EP | 2038632 | B1 | 1/2012 | |
| FR | 2935706 | A1 | 3/2010 | |
| GB | 2223855 | A * | 4/1990 | ............... G01N 3/32 |

OTHER PUBLICATIONS

Zheng Yong Yu et al., A New Energy-Critical Plane Damage Parameter for Multiaxial Fatigue Life Prediction of Turbine Blades, Materials, vol. 10, No. 5, May 31, 2017.
Guo, Qiang et al., Research on high-cycle fatigue behavior of fv520b steel based on intrinsic dissipation, Acta Metallurgica Sinica, vol. 51, No. 4, Apr. 30, 2015.
First Search Report from CN2020100107288.
International Search Report, PCT/CN/2020/106873, Oct. 28, 2020.

* cited by examiner

US 12,379,293 B2

METHOD, APPARATUS AND PROGRAM PRODUCT FOR PREDICTING MULTIAXIAL FATIGUE LIFE

CROSS REFERENCE TO RELATED APPLICATION

The present application is a U.S. National Stage of International Application No. PCT/CN2020/106873, filed on Aug. 4, 2020, the contents of all of which are incorporated herein by reference in their entireties for all purposes.

BACKGROUND

In engineering practice, most materials and structures in the fields of automobiles, high-speed trains, and steam turbines actually bear fatigue loads, most of materials and structures either directly bear multiaxial fatigue loads or are in the states of multiaxial stress and strain at the local defective and non-continuous positions, which eventually manifests as multiaxial fatigue failure. In view of the fact that multiaxial fatigue is closer to the real service conditions of materials and structures, the research on multiaxial fatigue is very important, and the prediction of multiaxial fatigue life of materials is the core.

SUMMARY

A first aspect of the disclosure provides a method for predicting multiaxial fatigue life, including:
  obtaining a first temperature rise value of a to-be-tested material in a first cycle;
  determining first inherent dissipated energy (also referred to as first dissipated energy) of the to-be-tested material in the first cycle according to the first temperature rise value and a time parameter value (also referred to as time constant); and
  determining a multiaxial fatigue life of the to-be-tested material according to a first proportional value, the first inherent dissipated energy, axial fatigue test parameters (also referred to tensional fatigue parameters) and tangential fatigue test parameters (also referred to torsional fatigue parameters); and the first proportional value is a ratio of an axial (also referred to tensional) strain amplitude to a tangential (also referred to torsional) strain amplitude of a multiaxial fatigue test, the axial fatigue test parameters are configured to represent an axial fatigue resistance of the to-be-tested material, and the torsional fatigue test parameters are configured to represent a torsional fatigue resistance of the to-be-tested material.

A second aspect of the disclosure provides an electronic device, including:
  a memory, storing a computer program; and
  a processor, configured to execute the computer program in the memory to implement the steps of any method in the first aspect.

In a third aspect, the disclosure provides a non-transitory computer readable storage medium, storing a computer program thereupon. When the computer program in the storage medium is executed by a processor, the processor is caused to implement the steps of any method in the first aspect.

Other features and advantages of the disclosure will be described in detail in the subsequent detailed description.

BRIEF DESCRIPTION OF THE DRAWINGS

The accompanying drawings are intended to provide a further understanding of the disclosure, form a part of the description, and are used to explain the disclosure together with the following detailed description, but do not constitute a limitation to the disclosure. In the accompanying drawings.

DETAILED DESCRIPTION

The detailed description of the disclosure is described in detail below in combination with the accompanying drawings. It should be understood that the detailed description described herein is only used to illustrate and explain the disclosure and are not used to limit the disclosure.

The disclosure relates to the technical field of fatigue failure, in particular to a method and apparatus for predicting multiaxial fatigue life, and a program product.

In engineering practice, most materials and structures in the fields of automobiles, high-speed trains, and steam turbines actually bear fatigue loads, most of materials and structures either directly bear multiaxial fatigue loads or are in the states of multiaxial stress and strain at the local defective and non-continuous positions, which eventually manifests as multiaxial fatigue failure. In view of the fact that multiaxial fatigue is closer to the real service conditions of materials and structures, the research on multiaxial fatigue is very important, and the prediction of multiaxial fatigue life of materials is the core.

A current method for predicting the multiaxial fatigue life of materials is usually to obtain the stress and strain states during the multiaxial fatigue test of the materials, and then use the stress and strain states be equivalent to the uniaxial fatigue damage parameter, for example, the stress and strain states of brittleness material are equivalent to the axial fatigue damage parameter, and the stress and strain states of toughness material are equivalent to the torsional fatigue damage parameter, and then a relationship between the fatigue damage parameter and the fatigue life is established according to the uniaxial fatigue test, and then the multiaxial fatigue life of the materials is obtained according to the equivalent fatigue damage parameter.

However, the uniaxial fatigue damage parameter can only represent the axial or torsional uniaxial fatigue resistance.

For some materials with significantly different axial and torsional fatigue resistances, the uniaxial fatigue damage parameter cannot fully consider the influence of the axial and torsional fatigue resistance on the materials, and thus, the applicability of equivalent uniaxial-based multiaxial fatigue life prediction methods to different materials is limited.

Figure 1:
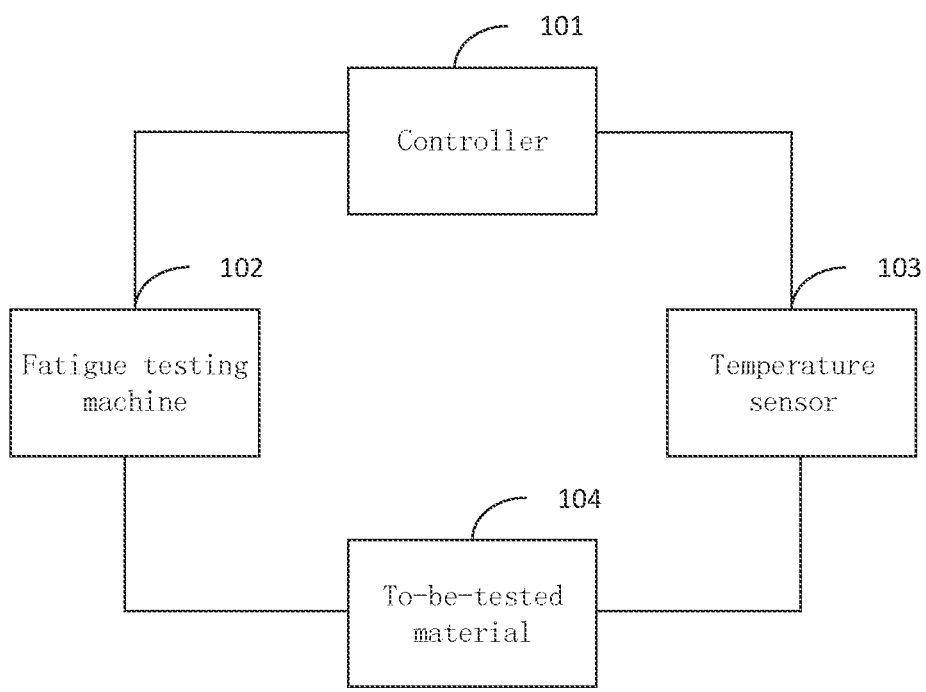
FIG. 1 is a schematic structural diagram of a system for predicting multiaxial fatigue life illustrated according to an example.

FIG. 1 is a schematic structural diagram of a system for predicting multiaxial fatigue life illustrated according to an example. As shown in FIG. 1, the system includes: a controller 101, a fatigue testing machine 102, a temperature sensor 103 and a to-be-tested material 104. The controller 101 is connected to the fatigue testing machine 102 and the temperature sensor 103 respectively, and the to-be-tested material 104 is connected to the fatigue testing machine 102 and the temperature sensor 103 separately.

In this example, the fatigue testing machine 102 is configured to perform a multiaxial fatigue test on the to-be-tested material 104 according to a fixed frequency cycle with a ratio of an axial strain amplitude to a torsional strain amplitude being a first proportional value. For example, black matte paint may be sprayed on the surface of the to-be-tested material 104 in advance to increase the thermal emissivity of the surface of the to-be-tested material 104, and the to-be-tested material 104 is fixedly installed on the fatigue testing machine 102 through a fixture.

The temperature sensor 103 is configured to obtain a surface temperature of the to-be-tested material 104 during the cyclic loading of strain by the fatigue testing machine 102 at an ultra-high loading frequency, e.g., a frequency of 20 kHz. In some examples, the temperature sensor may be an infrared camera, and the infrared camera may realize real-time, non-contact, non-destructive and high-sampling-frequency temperature acquisition of the to-be-tested material 104. Further, after the infrared camera is erected, the position of the infrared camera is adjusted so that a thermal image of the to-be-tested material 104 is in a field of view of the infrared camera.

The controller 101 is configured to determine a multiaxial fatigue life of the to-be-tested material according to the first proportional value and the surface temperature, collected by the temperature sensor, of the to-be-tested material 104.

The following describes how the multiaxial fatigue life predicting system provided by the disclosure tests the multiaxial fatigue life with reference to specific examples.

Figure 2:
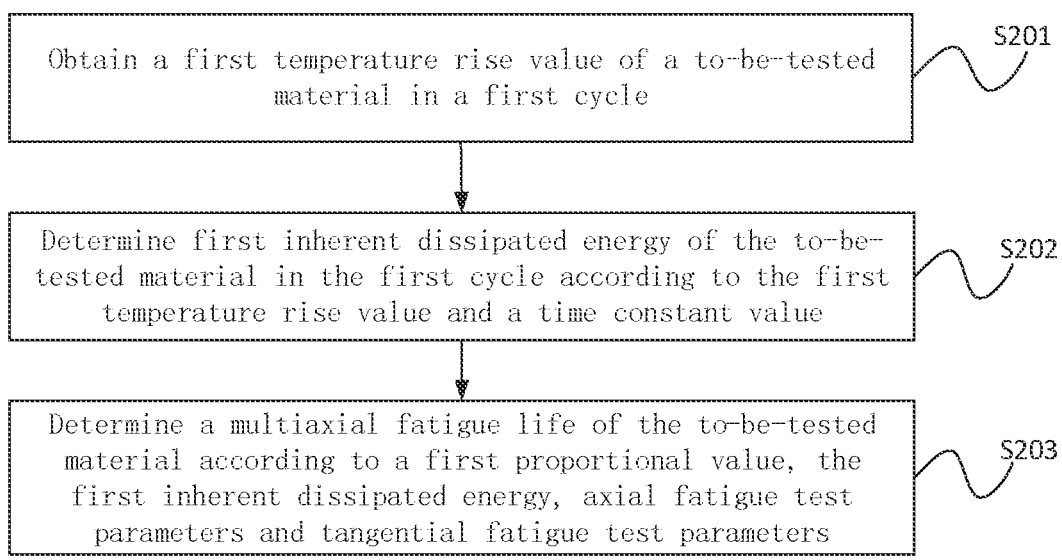
FIG. 2 is a flow diagram of a method for predicting multiaxial fatigue life illustrated according to an example.

FIG. 2 is a flow diagram of a method for predicting multiaxial fatigue life illustrated according to an example. As shown in FIG. 2, the method includes:

S201, a first temperature rise value of a to-be-tested material in a first cycle is obtained.

In this example, the fatigue testing machine is controlled to perform a multiaxial fatigue test on the to-be-tested material according to a fixed frequency with a ratio of an axial (also referred to tensional) strain amplitude to a tangential (also referred to torsional) strain amplitude being a first proportional value. Before starting the multiaxial fatigue test, the infrared camera is controlled to collect an average value of a temperature of a target region on the surface of the to-be-tested material as a first temperature.

Further, after the multiaxial fatigue test is started, an average value of the temperature of the target region on the surface of the to-be-tested material in each cycle is collected as a second temperature, and then the first temperature rise value of the target region on the surface of the to-be-tested material in each cycle is determined according to a difference between the second temperature and the first temperature. For example, the target region is a region where the surface strain of the to-be-tested material is the largest, and is also a dangerous section of the to-be-tested material.

Further, after the first temperature rise value of the surface of the to-be-tested material in each cycle is obtained, if the difference between the first temperature rise values of the surface of the to-be-tested material in two consecutive cycles is less than a preset threshold, any one of the two consecutive cycles is taken as the first cycle, and the first temperature rise value of the surface of the to-be-tested material in the first cycle is obtained.

S202, first inherent dissipated energy (also referred to first dissipated energy) of the to-be-tested material in the first cycle is determined according to the first temperature rise value and a time parameter value (also referred to time constant).

Further, after the first temperature rise value of the target region on the surface of the to-be-tested material in each cycle is determined, according to a duration of each cycle and the first temperature rise value of the target region on the surface of the to-be-tested material in each cycle, a corresponding relationship between the first temperature rise value and time is determined, that is, a corresponding functional relationship between the first temperature rise value and the time.

Then the first inherent dissipated energy is determined according to the corresponding relationship between the first temperature rise value and the time, the time constant, and a density and a specific heat capacity of the to-be-tested material.

For example, a formula for calculating the inherent dissipated energy is shown in formula (1):

$$\rho C\left(\frac{\partial \theta}{\partial t} + \frac{\theta}{\tau_{eq}}\right) = d_1 \quad (1)$$

where, $\rho$ is the density of the to-be-tested material, C is the specific heat capacity of the to-be-tested material; $\theta$ is the temperature rise value; $d_1$ is the inherent dissipated energy; t is the time; and $\tau_{eq}$ is the time constant, which is a time dimension parameter, $\tau_{eq}$ characterizes the heat loss. For example, the first temperature rise value of the surface of the to-be-tested material in the first cycle is substituted into $\theta$, the corresponding relationship between the first temperature rise value and the time is substituted into $$\frac{\partial \theta}{\partial t},$$

the value of t is the duration of the first cycle, and then the first inherent dissipated energy may be calculated according to formula (1).

S203, a multiaxial fatigue life of the to-be-tested material is determined according to the first proportional value, the first inherent dissipated energy, axial fatigue test parameters (also referred to tensional fatigue parameters) and tangential fatigue test parameters (also referred to torsional fatigue parameters).

In this example, the first proportional value is a ratio of an axial strain amplitude to a torsional strain amplitude of the multiaxial fatigue test. The axial fatigue test parameters are configured to represent an axial fatigue resistance of the to-be-tested material, and the torsional fatigue test parameters are configured to represent a torsional fatigue resistance of the to-be-tested material. The axial fatigue test parameters may be obtained by performing an axial fatigue test on the to-be-tested material. For example, the axial fatigue test is a uniaxial tension-compression fatigue test. The torsional fatigue test parameters may be obtained by performing a torsional fatigue test on the to-be-tested material. For example, the torsional fatigue test is a pure torsion fatigue test.

For example, a formula for calculating the multiaxial fatigue life is shown in formula (2):

$$N_{f,p} = (1-k) \cdot N_{f,A} + k \cdot N_{f,T} \quad (2)$$

where, $N_{f,p}$ is the multiaxial fatigue life; $N_{f,A}$ is the axial fatigue life under the same equivalent strain; $N_{f,T}$ is the torsional fatigue life under the same equivalent strain; and k is a weight coefficient, a value range of the weight coefficient is 0≤k≤1, a specific value is determined by the ratio of the axial strain amplitude to the torsional strain amplitude of the multiaxial fatigue test, and an expression of k is shown in formula (3):

$$k = \frac{2}{\pi} actan\left(\frac{\lambda}{\sqrt{3}}\right) \quad (3)$$

where, $\lambda$ is the ratio of the axial strain amplitude to the torsional strain amplitude of the multiaxial fatigue test, that is, a first ratio, a value range of the first ratio is 0-∞, and a value range corresponding to k is 0-1. In particular, when $\lambda = \sqrt{3}$, k=0.5, which represents the multiaxial fatigue life under the multiaxial fatigue condition and is an average superposition of the uniaxial tensile-compression fatigue life $N_{f,A}$ and the pure torsional fatigue life NAT under the same equivalent strain.

The axial fatigue resistance and the torsional fatigue resistance may be represented by the axial fatigue test parameters and the torsional fatigue test parameters respectively. Thus, an axial fatigue strength coefficient and an axial fatigue strength exponent of the axial fatigue test parameters, and a torsional fatigue strength coefficient and a torsional fatigue strength exponent of the torsional fatigue test parameters are substituted into formula (2), and the following formula may be obtained:

$$N_{f,p} = \frac{(1-k)}{D_A} \cdot d_{1,cycle}^{1/L_A} + \frac{k}{D_T} \cdot d_{1,cycle}^{1/L_T} \quad (4)$$

where, $d_{i,cycle}$ is the first inherent dissipated energy calculated by formula (1). $D_A$ is equivalent to the axial fatigue strength coefficient, $D_T$ is equivalent to the torsional fatigue strength coefficient, $L_A$ is equivalent to the axial fatigue strength exponent, and $L_T$ is equivalent to the torsional fatigue strength exponent. Further, both $D_A$ and $L_A$ are the axial fatigue test parameters, which may be configured to represent the axial fatigue resistance of the to-be-tested material. Both $D_T$ and $L_T$ are the torsional fatigue test parameters, which may be configured to represent the torsional fatigue resistance of the to-be-tested material. $D_A$ and $L_A$ may be obtained by performing the axial fatigue test on the to-be-tested material. $D_T$ and $L_T$ may be obtained by performing the torsional fatigue test on the to-be-tested material.

By the above solution, the first temperature rise value of the to-be-tested material in the first cycle may be obtained; the first inherent dissipated energy of the to-be-tested material in the first cycle is determined according to the first temperature rise value and the time constant; and the multiaxial fatigue life of the to-be-tested material is determined according to the first proportional value, the first inherent dissipated energy, the axial fatigue test parameters and the torsional fatigue test parameters. The first proportional value is the ratio of the axial strain amplitude to the torsional strain amplitude of the multiaxial fatigue test, the axial fatigue test parameters are configured to represent the axial fatigue resistance of the to-be-tested material, and the torsional fatigue test parameters are configured to represent the torsional fatigue resistance of the to-be-tested material. The tensile-compression fatigue resistance and torsional fatigue resistance of the to-be-tested material are fully considered, so the method has a wide range of applicability to different materials, and the inherent dissipated energy is used as the fatigue damage parameter, which may be calculated by temperature data collected by the temperature acquisition apparatus such as the infrared camera in a real-time and non-contact mode. Therefore, the inherent dissipated energy is easy to obtain, which also provides a new idea for online detection and life prediction for equipment in service, the generation of the inherent dissipated energy is accompanied by the fatigue damage evolution process of the to-be-tested material, and the inherent dissipated energy can more accurately represent the fatigue damage state and evolution process. Thus, the method of the disclosure is adopted, and the accuracy for predicting the multiaxial fatigue life is generally better than that of life prediction methods based solely on stress and strain states.

Figure 3:
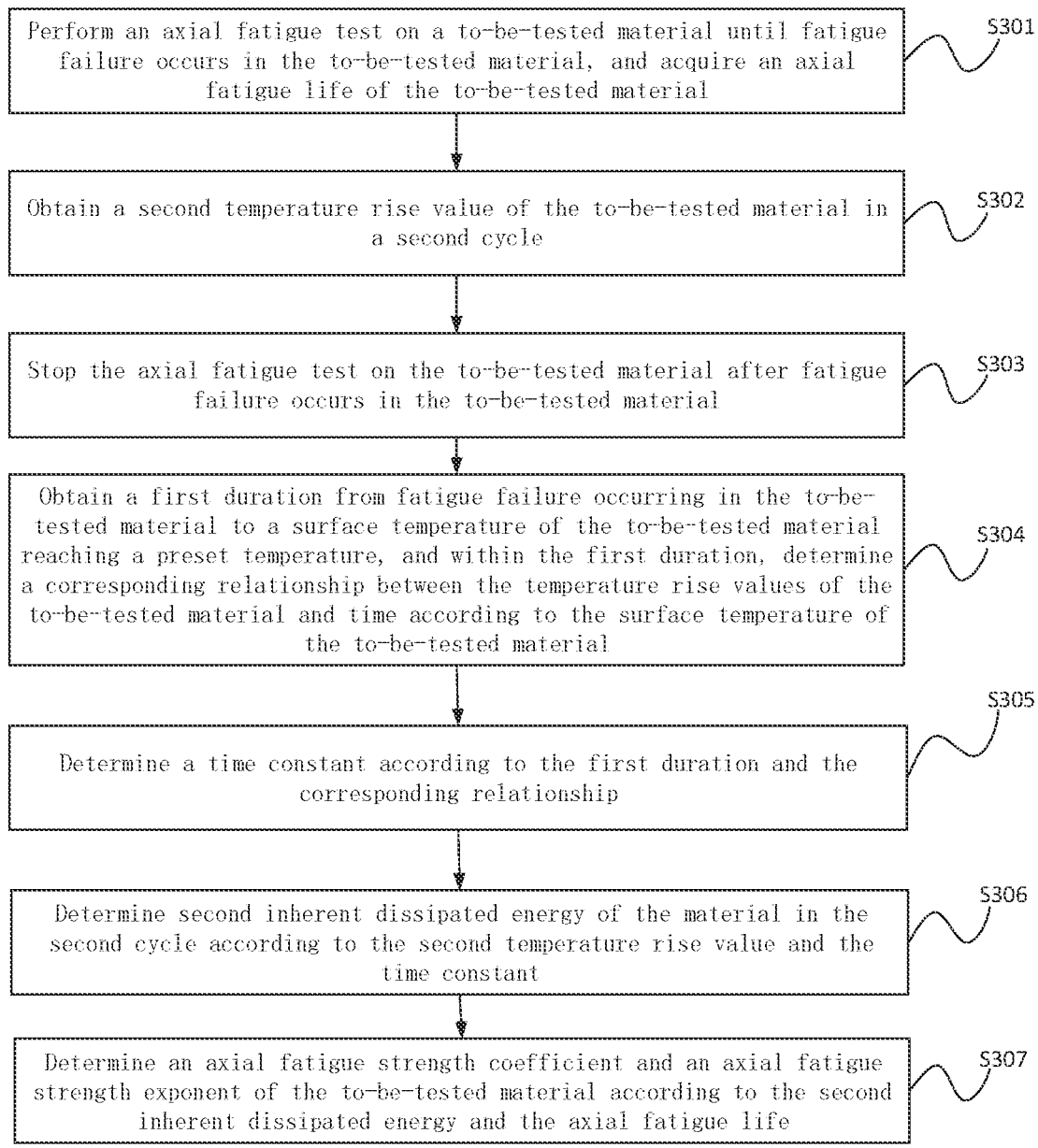
FIG. 3 is a flow diagram of a method for determining axial fatigue test parameter illustrated according to an example.

The following describes how to obtain the axial fatigue test parameters with reference to specific examples. FIG. 3 is a flow diagram of a method for determining axial fatigue test parameter illustrated according to an example. As shown in FIG. 3, the method includes:

S301, the axial fatigue test is performed on the to-be-tested material until fatigue failure occurs in the to-be-tested material, and an axial fatigue life of the to-be-tested material is determined.

In this example, the axial fatigue test is performed on the to-be-tested material, a first strain amplitude of the axial fatigue test is larger than a strain amplitude corresponding to an axial fatigue limit of the to-be-tested material, so as to ensure that the to-be-tested material may undergo fatigue failure during the axial fatigue test, and a first axial fatigue life of the to-be-tested material is determined.

S302, a second temperature rise value of the to-be-tested material in a second cycle is obtained.

For example, before starting the axial fatigue test on the to-be-tested material, the infrared camera is controlled to collect an average value of a temperature of a target region on the surface of the to-be-tested material as a third temperature. After the tension-compression fatigue test is started, an average value of the temperature of the target region on the surface of the to-be-tested material in each cycle is collected as a fourth temperature, and then the second temperature rise value of the target region on the surface of the to-be-tested material in each cycle is determined according to a difference between the fourth temperature and the third temperature. For example, the target region is a region where the surface strain of the to-be-tested material is the largest, and is also a dangerous section of the to-be-tested material.

Further, after the second temperature rise value of the surface of the to-be-tested material in each cycle is obtained, if the difference between the second temperature rise values of the surface of the to-be-tested material in two consecutive cycles is less than a preset threshold, any one of the two consecutive cycles is taken as the second cycle, and the second temperature rise value of the surface of the to-be-tested material in the second cycle is obtained.

S303, the axial fatigue test on the to-be-tested material is stopped after fatigue failure occurs in the to-be-tested material.

S304, a first duration from fatigue failure occurring in the to-be-tested material to a surface temperature of the to-be-tested material reaching a preset temperature is obtained, and within the first duration, a corresponding relationship between the temperature rise values of the to-be-tested material and time is determined according to the surface temperature of the to-be-tested material.

S305, the time constant is determined according to the first duration and the corresponding relationship between the temperature rise and time.

For example, after the axial fatigue test on the to-be-tested material is stopped, no plastic strain occurs inside the to-be-tested material, at this time, the inherent dissipated energy of the to-be-tested material is 0, and the temperature drop on the surface of the to-be-tested material is completely caused by the heat exchange between the to-be-tested material and the external environment, and thus, after the fatigue test is stopped, an integral over time of the inherent dissipated energy obtained according to formula (1) is 0, and a calculation formula of the integral is as follows:

$$\begin{cases} R(\tau_{eq}) = \int_{\Gamma} s(t, \tau_{eq})^2 dt \\ \frac{\partial R}{\partial \tau_{eq}} \Big|_{\tau_{eq}=\tau_{opt}} = 0 \end{cases} \quad (5)$$

where, $R(\tau_{eq})$ is the quadratic integral of the inherent dissipated energy within the first duration, and $R(\tau_{eq})$ is a function of t.

$$\frac{\partial \theta}{\partial t}$$

and θ may be obtained from the corresponding relationship between the temperature rise values of the to-be-tested material and the time. Then $$\frac{\partial \theta}{\partial t}$$

is substituted into formula (1), and quadratic integration is performed on formula (1) with time to obtain $R(\tau_{eq})$.

In formula (5), γ is the first duration from fatigue failure occurring the to-be-tested material to the surface temperature of the to-be-tested material dropping to the preset temperature, and the preset temperature is a third temperature.

Further, after the fatigue test is stopped, the integral over time of the inherent dissipated energy is 0, so $$\frac{\partial R}{\partial \tau_{eq}}$$

is 0, and when a value of the time constant $\tau_{eq}$ IS $\tau_{opt}$, $$\frac{\partial R}{\partial \tau_{eq}}$$

is 0, so the value of the time constant $\tau_{eq}$ is $\tau_{opt}$.

S306, second inherent dissipated energy of the material in the second cycle is determined according to the second temperature rise value and the time constant.

Further, after it is determined that the value of the time constant $\tau_{eq}$ is $\tau_{opt}$, then the second temperature rise value, $\tau_{opt}$, $$\frac{\partial \theta}{\partial t}$$

and a duration of the second cycle are substituted into formula (1), so as to obtain the second inherent dissipated energy in the second cycle.

S307, the axial fatigue strength coefficient and the axial fatigue strength exponent of the to-be-tested material are determined according to the second inherent dissipated energy and the axial fatigue life.

Further, according to the time from the start of the axial fatigue test on the to-be-tested material to the fatigue failure occurring in the to-be-tested material, the total quantity of cycles is the first axial fatigue life of the to-be-tested material under the first strain amplitude.

For example, an amplitude value of the first strain amplitude is increased according to a preset increment amplitude value to obtain a second strain amplitude value, and then the axial fatigue test on the to-be-tested material is started according to the second strain amplitude value until fatigue failure occurs, a second axial fatigue life of the to-be-tested material is determined, and in the same manner, the second inherent dissipated energy at the second strain amplitude value is calculated.

In the same way, until the axial fatigue test on the to-be-tested material is started according to a fifth strain amplitude value until fatigue failure occurs, a fifth axial fatigue life of the to-be-tested material is determined, and the second inherent dissipated energy at the fifth strain amplitude value is calculated. Then, the second inherent dissipated energy under the first to fifth strain amplitude values and the first to fifth axial fatigue lives are fitted in a preset coordinate system, and an obtained curve is shown in formula (6):

$$d_{1,A} = D_A \cdot (N_A)^{L_A} \quad (6)$$

where, $d_{1,A}$ is the second inherent dissipated energy, a fitting coefficient $D_A$ is the axial fatigue strength coefficient, and a fitting exponent $L_A$ is the axial fatigue strength exponent.

Through the above solution, the axial fatigue test may be performed on the to-be-tested material, after the to-be-tested material has fatigue failure, the time constant is determined, and then the second inherent dissipated energy is determined according to the time constant, and then the axial fatigue strength coefficient and the axial fatigue strength exponent of the to-be-tested material are determined according to the corresponding relationship between the second dissipated energy and the axial fatigue life.

Figure 4:
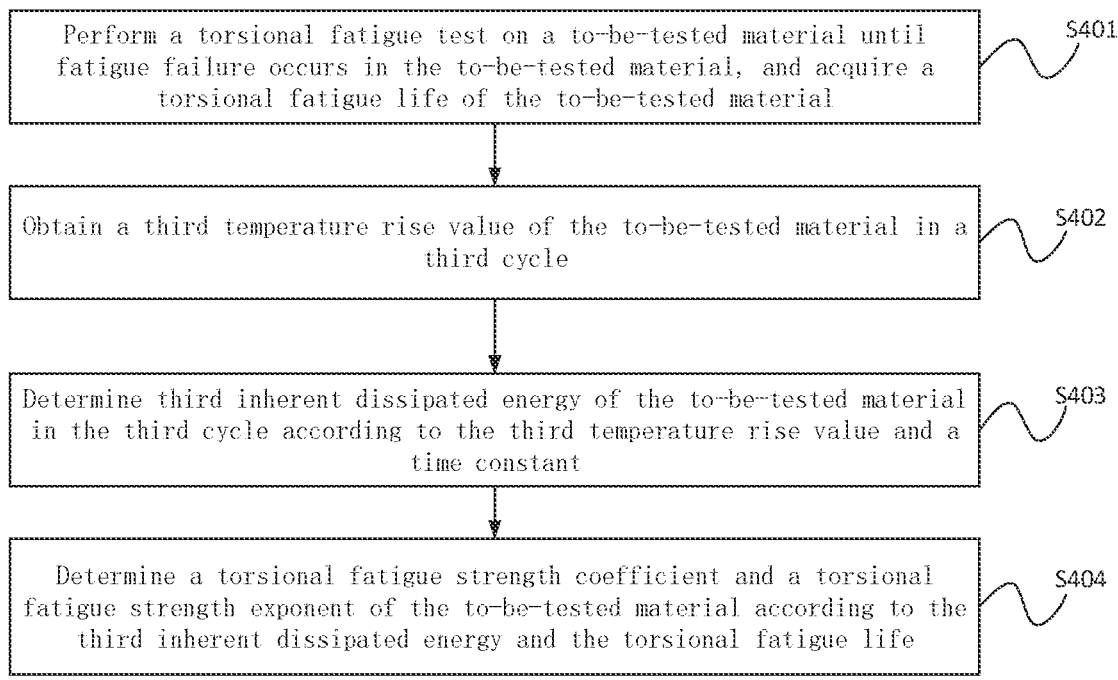
FIG. 4 is a flow diagram of a method for determining torsional fatigue test parameter illustrated according to an example.

The following describes how to obtain the torsional fatigue test parameters with reference to specific examples. FIG. 4 is a flow diagram of a method for determining torsional fatigue test parameter illustrated according to an example. As shown in FIG. 4, the method includes:

S401, the torsional fatigue test is performed on the to-be-tested material until fatigue failure occurs in the to-be-tested material, and a torsional fatigue life of the to-be-tested material is determined.

In this example, the torsional fatigue test is performed on the to-be-tested material, a first strain amplitude of the torsional fatigue test is larger than a strain amplitude corresponding to a torsional fatigue limit of the to-be-tested material, so as to ensure that the to-be-tested material may undergo fatigue failure during the torsional fatigue test, and a first torsional fatigue life of the to-be-tested material is determined.

S402, a third temperature rise value of the to-be-tested material in a third cycle is obtained.

For example, before starting the torsional fatigue test on the to-be-tested material, the infrared camera is controlled to collect an average value of a temperature of a target region on the surface of the to-be-tested material as a fifth temperature. After the torsional fatigue test is started, an average value of the temperature of the target region on the surface of the to-be-tested material in each cycle is collected as a sixth temperature, and then the third temperature rise value of the target region on the surface of the to-be-tested material in each cycle is determined according to a difference between the sixth temperature and the fifth temperature. For example, the target region is a region where the surface strain of the to-be-tested material is the largest, and is also a dangerous section of the to-be-tested material.

Further, after the third temperature rise value of the surface of the to-be-tested material in each cycle is obtained, if the difference between the third temperature rise values of the surface of the to-be-tested material in two consecutive cycles is less than a preset threshold, any one of the two consecutive cycles is taken as the third cycle, and the third temperature rise value of the surface of the to-be-tested material in the third cycle is obtained.

S403, third inherent dissipated energy of the to-be-tested material in the third cycle is determined according to the third temperature rise value and the time constant.

Further, after the third temperature rise value of the target region on the surface of the to-be-tested material in each cycle is determined, according to a duration of each cycle and the third temperature rise value of the target region on the surface of the to-be-tested material in each cycle, a corresponding relationship between the third temperature rise value and time is determined, that is, a corresponding functional relationship between the third temperature rise value and the time.

For example, after it is determined that the value of the time constant $\tau_{eq}$ is $\tau_{opt}$ in step S304, $\tau_{opt}$, the third temperature rise value, and the corresponding functional relationship between the third temperature rise value and the time are substituted into formula (1), so as to obtain the third inherent dissipated energy in the third cycle.

S404, the torsional fatigue strength coefficient and the torsional fatigue strength exponent of the to-be-tested material are determined according to the third inherent dissipated energy and the torsional fatigue life.

Further, according to the time from the start of the torsional fatigue test on the to-be-tested material to the fatigue failure occurring in the to-be-tested material, the quantity of cycles from the start of the torsional fatigue on the to-be-tested material is the first torsional fatigue life of the to-be-tested material under the first strain amplitude.

For example, the amplitude value of the first strain amplitude is increased according to the preset increment amplitude value to obtain the second strain amplitude value, and then the torsional fatigue test on the to-be-tested material is started according to the second strain amplitude value until fatigue failure occurs, a second torsional fatigue life of the to-be-tested material is determined, and in the same manner, the third inherent dissipated energy at the second strain amplitude value is calculated.

In the same way, until the torsional fatigue test on the to-be-tested material is started according to the fifth strain amplitude value until fatigue failure occurs, a fifth torsional fatigue life of the to-be-tested material is determined, and the third inherent dissipated energy at the fifth strain amplitude value is calculated. Then, the third inherent dissipated energy under the first to fifth strain amplitude values and the first to fifth torsional fatigue lives are fitted in a preset coordinate system, and an obtained curve is shown in formula (7):

$$d_{1,T} = D_T (N_T)^{L_T} \qquad (7)$$

where, $d_{1,T}$ is the third inherent dissipated energy, a fitting coefficient $D_T$ is the torsional fatigue strength coefficient, and a fitting exponent $L_T$ is the torsional fatigue strength exponent.

Through the above solution, the torsional fatigue test may be performed on the to-be-tested material, the third inherent dissipated energy in the third cycle in the torsional fatigue test process is determined, and then the torsional fatigue strength coefficient and the torsional fatigue strength exponent of the to-be-tested material are determined according to the corresponding relationship between the third dissipated energy and the torsional fatigue life.

In order to illustrate the detailed description of the method of the disclosure more concretely, the following takes a group of 316L stainless steel as the to-be-tested material as an example to describe how the disclosure predicts the multiaxial fatigue life.

First, black matte paint is sprayed on the surface of a 316L stainless steel sample to improve the thermal emissivity of the surface of the sample, so as to ensure the accuracy of temperature acquisition by the infrared camera. The infrared camera is erected, and the position of the infrared camera is adjusted so that a parallel section of the sample is right in a field of view of the infrared camera. Further, non-uniform correction is performed on the infrared camera, and a temperature acquisition range and a sampling frequency of the infrared camera are set.

Secondly, an appropriate loading strain amplitude value is selected, and a set of uniaxial tension-compression fatigue tests with 5 different strain amplitude values and a set of pure torsional fatigue tests with 5 different strain amplitude values are performed. During each fatigue test, the thermal imager is first turned on to collect the temperature, and then starts the fatigue test, and the temperature field data of the sample during the fatigue test are collected in real time. When the fatigue failure occurs in the sample, the fatigue test ends, and when the temperature of the sample cools down to a near room temperature, the temperature acquisition of the thermal imager is stopped.

According to the temperature field data collected in the fatigue test, the formula (1) is used to calculate the second inherent dissipated energy of all the uniaxial tension-compression fatigue tests and the third inherent dissipated energy of the pure torsional fatigue tests.

Figure 5:
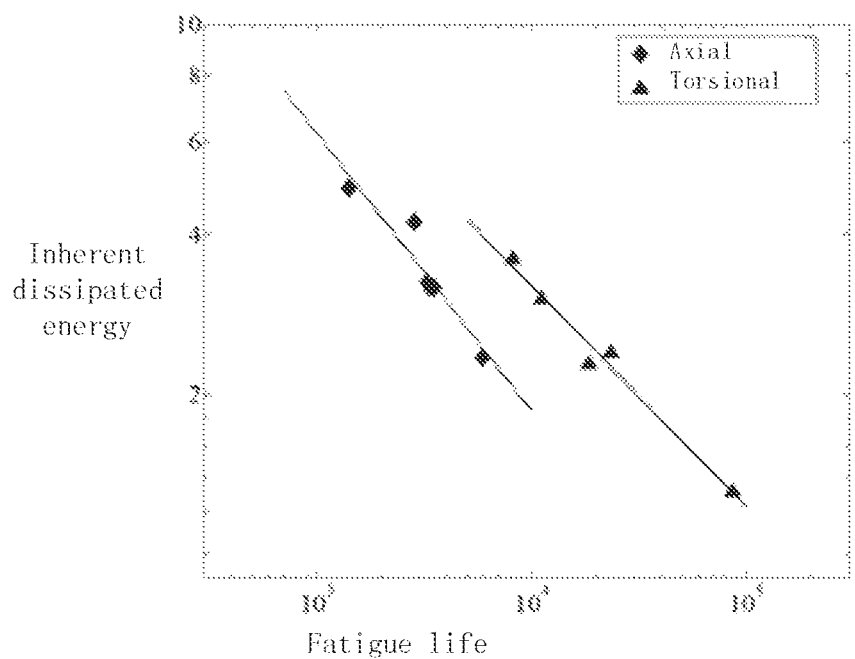
FIG. 5 is a schematic diagram of a relationship between inherent dissipated energy and a fatigue life in uniaxial tension-compression fatigue and pure torsional fatigue illustrated according to an example.

A plurality of second inherent dissipative energies and axial fatigue lives correspond to each other, and a plurality of third inherent dissipative energies and torsional fatigue lives correspond to each other, and according to the forms of formula (6) and formula (7), inherent dissipated energy and fatigue life equations under the uniaxial tension-compression fatigue and the pure torsional fatigue are established, respectively:

$$d_{1,A} = 2.34 \times 10^8 \cdot (N_A)^{-0.53} \quad (8)$$

$$d_{1,T} = 1.50 \times 10^8 \cdot (N_T)^{-0.42} \quad (9)$$

that is, the fitting coefficients $D_A=2.34\times10^8$, $D_T=1.50\times10^8$, the fitting exponent $L_A=-0.53$, $L_T=-0.42$, the fitting relationship is shown in FIG. 5, and FIG. 5 is a schematic diagram of a relationship between inherent dissipated energy and a fatigue life under uniaxial tension-compression fatigue and pure torsional fatigue illustrated according to an example. $D_A$, $D_T$, $L_A$ and $L_T$ are substituted into formula (4), and a formula for calculating the multiaxial fatigue life of the material based on the dissipated energy may be obtained:

$$N_{f,p} = \frac{(1-k)}{2.34 \times 10^8} \cdot d_{1,cycle}^{-1.89} + \frac{k}{1.50 \times 10^8} \cdot d_{1,cycle}^{-2.38} \quad (10)$$

where, the weight coefficient $$k = \frac{2}{\pi} \arctan\left(\frac{\lambda}{\sqrt{3}}\right)$$

is only related to the ratio $\lambda$ of the axial strain amplitude to the torsional strain amplitude of the multiaxial fatigue test. When the multiaxial fatigue life prediction is performed on the to-be-tested material, the ratio $\lambda$ of the axial strain amplitude to the torsional strain amplitude is determined, only the first inherent dissipated energy $d_{1,cycle}$ in the first cycle when the multiaxial fatigue test is performed on the to-be-tested material needs to be determined and is substituted into formula (10), and the multiaxial fatigue life under the multiaxial fatigue test condition may be estimated. Next, the accuracy of predicting the multiaxial life by formula (10) is verified.

Figure 6:
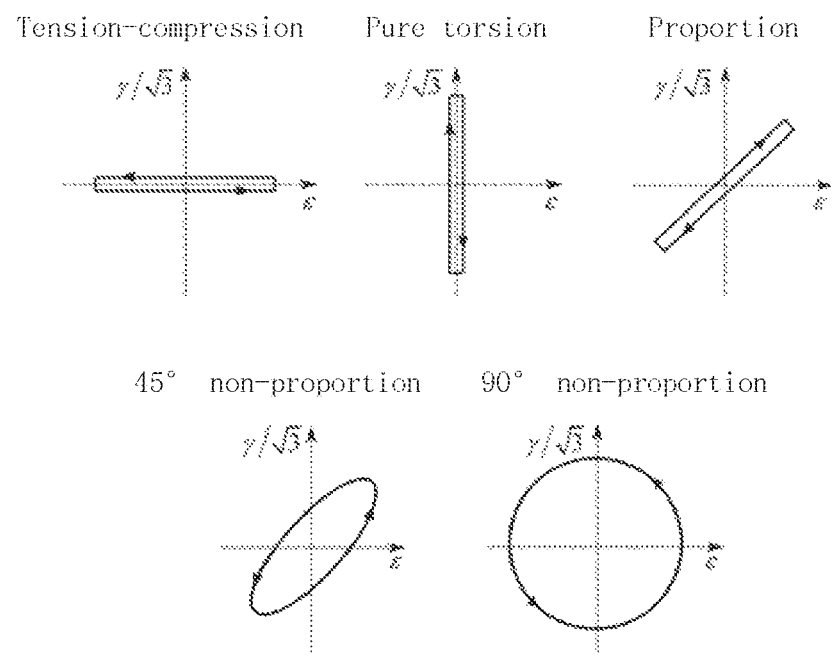
FIG. 6 is a schematic diagram of a load path illustrated according to an example.

In this example, when the fatigue test is performed on the to-be-tested material to verify the accuracy of formula (10), in addition to a uniaxial tension-compression load path and a pure torsional load path, three other multiaxial load paths are selected, which are a proportional load path, a 45° non-proportional load path, and a 90° non-proportional load path, and all 5 load paths are shown in FIG. 6. FIG. 6 is a schematic diagram of a load path illustrated according to an example. For each load path, 5 to 6 different loading strain amplitudes are selected for fatigue test, the surface temperature change of the sample in the fatigue process is collected at the same time, and formula (1) is adopted to calculate the first inherent dissipated energy in the first cycle.

Figure 7:
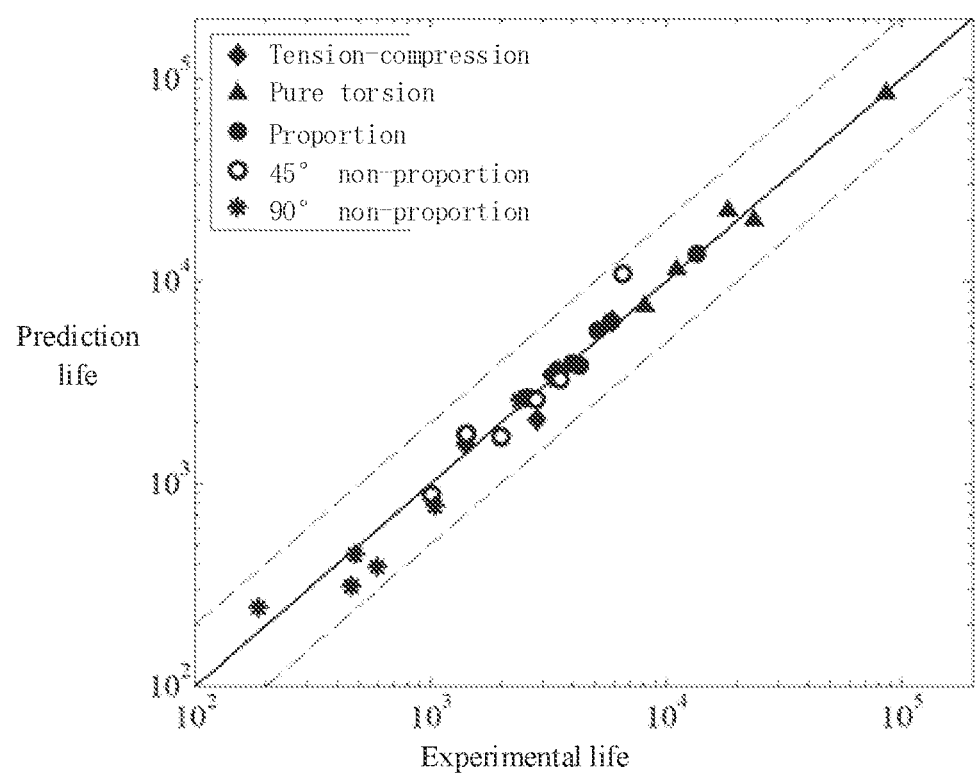
FIG. 7 is a comparison diagram of a multiaxial fatigue life prediction result and an experimental life result illustrated according to an example.

A comparison relationship between multiaxial fatigue life prediction results under five load paths and experimental lives by using the method of the disclosure is shown in FIG. 7. FIG. 7 is a comparison diagram of a multiaxial fatigue life prediction result and an experimental life result illustrated according to an example. A black diagonal line in the figure represents an ideal result equal to the multiaxial fatigue life obtained from the experiment, dotted lines indicate that the multiaxial fatigue life predicted according to formula (10) and the multiaxial fatigue life obtained by the experiment are within a factor of 2, and a range included by two dotted lines indicates that the multiaxial fatigue life predicted according to formula (10) is 0.5 to 2 times the multiaxial fatigue life obtained by the experiment. Data points in FIG. 7 represent the multiaxial fatigue lives predicted by formula (10) under different load paths. When the data points fall within the range of the dotted lines, it indicates that the fatigue life results predicted according to formula (10) are ideal. It can be seen from FIG. 7 that all data points fall within the range of the factor of 2, and most of the data points are very close to the straight line, or even fall on the straight line, so the accuracy of predicting the multiaxial fatigue life results by the method of the disclosure is very high.

Figure 8:
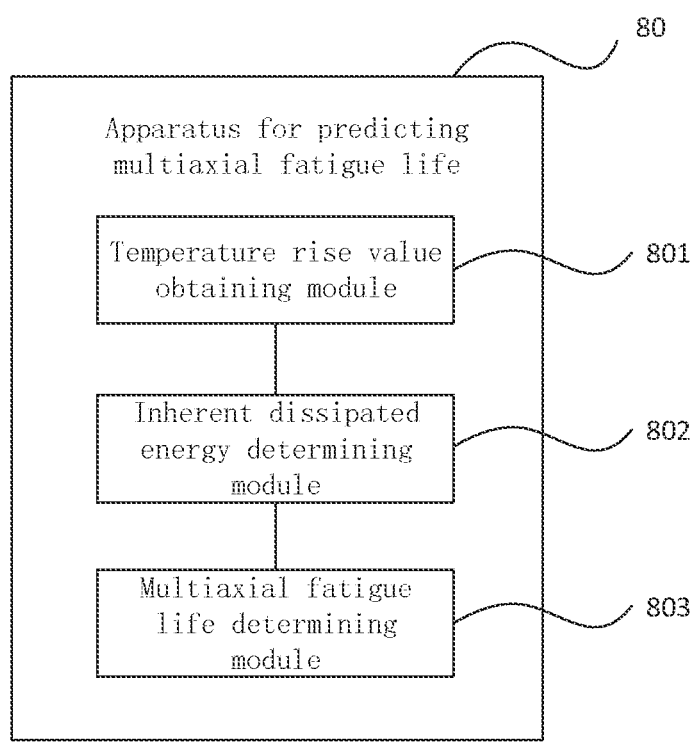
FIG. 8 is a block diagram of an apparatus for predicting multiaxial fatigue life illustrated according to an example.

FIG. 8 is a block diagram of an apparatus for predicting multiaxial fatigue life illustrated according to an example. As shown in FIG. 8, the apparatus 80 includes:

a temperature rise value obtaining module 801, configured to obtain a first temperature rise value of a to-be-tested material in a first cycle;

an inherent dissipated energy determining module 802, configured to determine first inherent dissipated energy of the to-be-tested material in the first cycle according to the first temperature rise value and a time constant; and a multiaxial fatigue life determining module 803, configured to determine a multiaxial fatigue life of the to-be-tested material according to a first proportional value, the first inherent dissipated energy, axial fatigue test parameters and torsional fatigue test parameters; and the first proportional value is a ratio of an axial strain amplitude to a torsional strain amplitude of a multiaxial fatigue test, the axial fatigue test parameters are configured to represent an axial fatigue resistance of the to-be-tested material, and the torsional fatigue test parameters are configured to represent a torsional fatigue resistance of the to-be-tested material.

In some examples, the axial fatigue test parameters include an axial fatigue strength coefficient and an axial fatigue strength exponent, and the multiaxial fatigue life determining module 803 is configured to:

perform an axial fatigue test on the to-be-tested material until fatigue failure occurs in the to-be-tested material, and acquire an axial fatigue life of the to-be-tested material;

obtain a second temperature rise value of the to-be-tested material in a second cycle;

determine second inherent dissipated energy of the to-be-tested material in the second cycle according to the second temperature rise value and the time constant; and determine the axial fatigue strength exponent and the axial fatigue strength coefficient of the to-be-tested material according to the second inherent dissipated energy and the axial fatigue life.

In some examples, the torsional fatigue test parameters include a torsional fatigue strength exponent and a torsional fatigue strength coefficient, and the multiaxial fatigue life determining module 803 is configured to:

perform a torsional fatigue test on the to-be-tested material until fatigue failure occurs in the to-be-tested material, and acquire a torsional fatigue life of the to-be-tested material;

obtain a third temperature rise value of the to-be-tested material in a third cycle;

determine third inherent dissipated energy of the to-be-tested material in the third cycle according to the third temperature rise value and the time constant; and determine the torsional fatigue strength coefficient and the torsional fatigue strength exponent of the to-be-tested material according to the third inherent dissipated energy and the torsional fatigue life.

Figure 9:
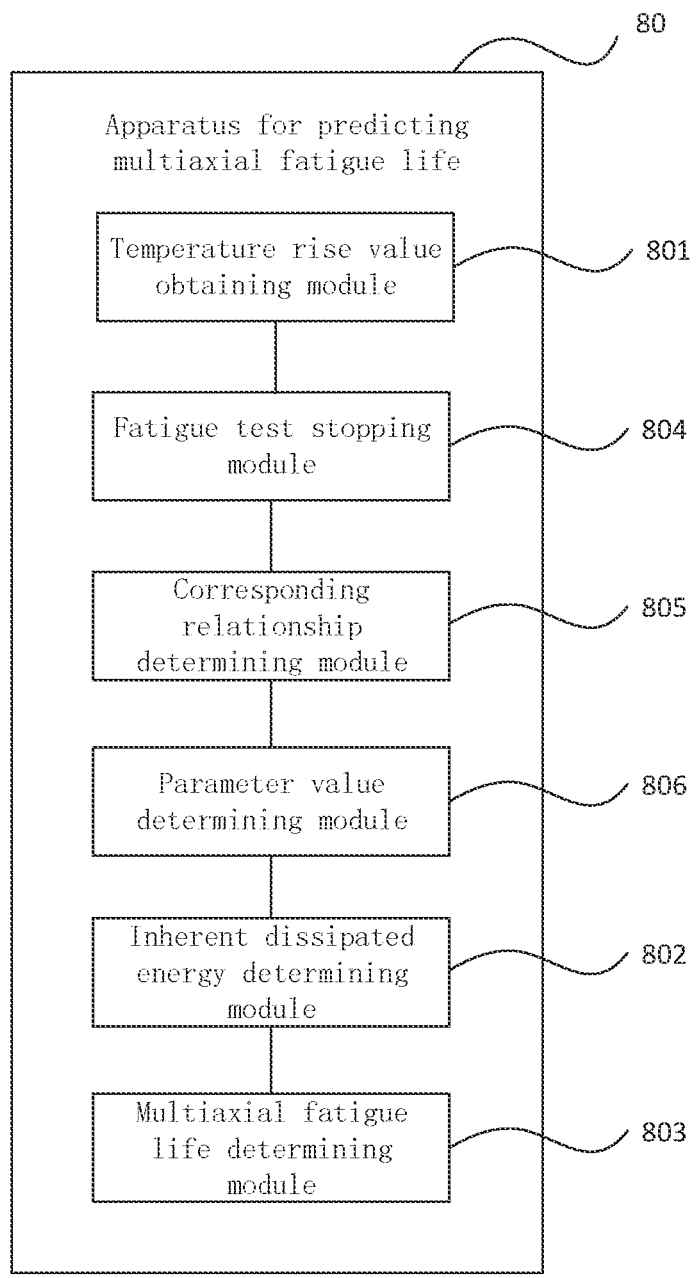
FIG. 9 is a block diagram of another apparatus for predicting multiaxial fatigue life illustrated according to an example.

In some examples, FIG. 9 is a block diagram of the apparatus for predicting multiaxial fatigue life illustrated according to an example shown in FIG. 8. As shown in FIG. 9, the apparatus 80 further includes:

a fatigue test stopping module 804, configured to stop performing the axial fatigue test on the to-be-tested material after fatigue failure occurs in the to-be-tested material;

a corresponding relationship determining module 805, configured to obtain a first duration from fatigue failure occurring in the to-be-tested material to a surface temperature of the to-be-tested material reaching a preset temperature, and within the first duration, determine a corresponding relationship between the temperature rise values of the to-be-tested material and time according to the surface temperature of the to-be-tested material; and a parameter value determining module 806, configured to determine the time constant according to the first duration and the corresponding relationship.

In some examples, the inherent dissipated energy determining module 802 is configured to:

determine the first inherent dissipated energy according to the first temperature rise value, a second duration of the first cycle, the time constant, a density of the to-be-tested material and a specific heat capacity of the to-be-tested material.

By the above apparatus, the first temperature rise value of the to-be-tested material in the first cycle is obtained; the first inherent dissipated energy of the to-be-tested material in the first cycle is determined according to the first temperature rise value and the time constant; and the multiaxial fatigue life of the to-be-tested material is determined according to the first proportional value, the first inherent dissipated energy, the axial fatigue test parameters and the torsional fatigue test parameters. The first proportional value is the ratio of the axial strain amplitude to the torsional strain amplitude of the multiaxial fatigue test, the axial fatigue test parameters are configured to represent the axial fatigue resistance of the to-be-tested material, and the torsional fatigue test parameters are configured to represent the torsional fatigue resistance of the to-be-tested material. The tensile-compression fatigue resistance and torsional fatigue resistance of the to-be-tested material are fully considered, so the apparatus has a wide range of applicability to different materials. At the same time, the method uses the dissipated energy released in the fatigue process of the material as a fatigue damage parameter, which may be calculated by temperature data collected by a temperature acquisition apparatus such as an infrared camera in a real-time and non-contact mode, so the dissipated energy is easy to obtain and provides a new idea for online detection and life prediction of equipment in service.

As for the apparatus in the above examples, the specific manner in which each module performs operations has been described in detail in the examples of the method, and detailed description will not be given here.

Figure 10:
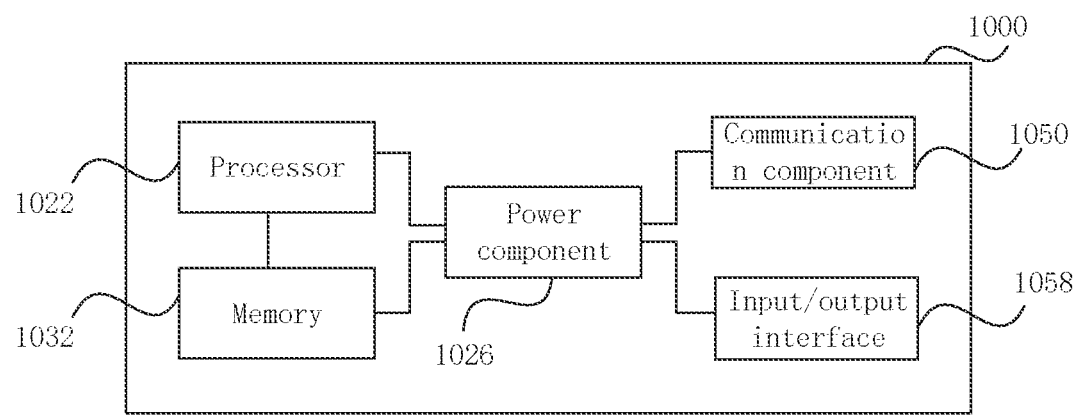
FIG. 10 is a block diagram of an electronic device illustrated according to an example.

FIG. 10 is a block diagram of an electronic device 1000 illustrated according to an example. Referring to FIG. 10, the electronic device 1000 includes one or more processors 1022, and a memory 1032 configured to store a computer program executable by the processor 1022. The computer program stored in the memory 1032 may include one or more modules each corresponding to a set of instructions. In addition, the processor 1022 may be configured to execute the computer program to execute the multiaxial fatigue life predicting method above.

In addition, the electronic device 1000 may further include a power component 1026 and a communication component 1050. The power component 1026 may be configured to execute power management of the electronic device 1000, and the communication component 1050 may be configured to realize communication of the electronic device 1000, such as wired or wireless communication. In addition, the electronic device 1000 may further include an input/output (I/O) interface 1058. The electronic device 1000 may operate an operating system stored in the memory 1032, such as Windows Server™, Mac OS X™, Unix™, Linux™, etc.

In another example, a computer-readable storage medium including program instructions is further provided. The program instructions, when executed by a processor, implement the steps of the multiaxial fatigue life predicting method above. For example, the computer-readable storage medium may be the above memory 1032 including the program instructions, and the above program instructions are executed by the processor 1022 of the electronic device 1000 to complete the multiaxial fatigue life predicting method above.

In another example, a computer program product is further provided. The computer program product contains a computer program executed by a programmable apparatus. The computer program has a code part which is configured to, when executed by the programmable apparatus, execute the multiaxial fatigue life predicting method above.

The preferred implementations of the disclosure are described in detail above in combination with the accompanying drawings. However, the disclosure is not limited to the specific details of the above implementations. Within the scope of the technical concept of the disclosure, a variety of simple modifications can be made to the technical solutions of the disclosure, and these simple modifications belong to the protection scope of the disclosure. In addition, it should be noted that the specific technical features described in the above detailed description can be combined in any suitable way without contradiction. In order to avoid unnecessary repetition, various possible combinations are not described in the disclosure.

In addition, various different implementations of the disclosure can also be combined arbitrarily. As long as they do not violate the idea of the disclosure, they should also be regarded as the contents disclosed in the disclosure.

What is claimed is:

1. A method for predicting multiaxial fatigue life, comprising:
obtaining a first temperature rise value of a to-be-tested material in a first cycle;
determining first inherent dissipated energy of the to-be-tested material in the first cycle according to the first temperature rise value and a time constant;
determining a multiaxial fatigue life of the to-be-tested material according to a first proportional value, the first inherent dissipated energy, axial fatigue test parameters and torsional fatigue test parameters; wherein the first proportional value is a ratio of an axial strain amplitude to a torsional strain amplitude of a multiaxial fatigue test, the axial fatigue test parameters are configured to represent an axial fatigue resistance of the to-be-tested material, and the torsional fatigue test parameters are configured to represent a torsional fatigue resistance of the to-be-tested material.

2. The method according to claim 1, wherein the axial fatigue test parameters comprise an axial fatigue strength coefficient and an axial fatigue strength exponent, and the axial fatigue test parameters are obtained by:
performing an axial fatigue test on the to-be-tested material until fatigue failure occurs in the to-be-tested material, and determining an axial fatigue life of the to-be-tested material;
obtaining a second temperature rise value of the to-be-tested material in a second cycle;
determining second inherent dissipated energy of the to-be-tested material in the second cycle according to the second temperature rise value and the time constant; and
determining the axial fatigue strength coefficient and the axial fatigue strength exponent of the to-be-tested material according to the second inherent dissipated energy and the axial fatigue life.

3. The method according to claim 2, further comprising:
stopping performing the axial fatigue test on the to-be-tested material after fatigue failure occurs in the to-be-tested material;
obtaining a first duration from fatigue failure occurring in the to-be-tested material to a surface temperature of the to-be-tested material reaching a preset temperature, and within the first duration, determining a corresponding relationship between the temperature rise values of the to-be-tested material and time according to the surface temperature of the to-be-tested material; and
determining the time constant according to the first duration and the corresponding relationship between the temperature rise and time.

4. The method according to claim 2, wherein the torsional fatigue test parameters comprise a torsional fatigue strength coefficient and a torsional fatigue strength exponent, and the torsional fatigue test parameters are obtained by:
performing a torsional fatigue test on the to-be-tested material until fatigue failure occurs in the to-be-tested material, and determining a torsional fatigue life of the to-be-tested material;
obtaining a third temperature rise value of the to-be-tested material in a third cycle;
determining third inherent dissipated energy of the to-be-tested material in the third cycle according to the third temperature rise value and the time constant; and
determining the torsional fatigue strength coefficient and the torsional fatigue strength exponent of the to-be-tested material according to the third inherent dissipated energy and the torsional fatigue life.

5. The method according to claim 4, wherein a formula for calculating the multiaxial fatigue life is:

$$N_{f,p} = \frac{(1-k)}{D_A} \cdot d_{1,cycle}^{1/L_A} + \frac{k}{D_T} \cdot d_{1,cycle}^{1/L_T}$$

wherein, $N_{f,p}$ is the multiaxial fatigue life, $d_{1,\,cycle}$ is the first inherent dissipated energy, k is a weight coefficient, and k is a specific value is determined by the ratio of the axial strain amplitude to the torsional strain amplitude of the multiaxial fatigue test, $D_A$ is equivalent to the axial fatigue strength coefficient, $D_T$ is equivalent to the torsional fatigue strength coefficient, $L_A$ is equivalent to the axial fatigue strength exponent, and $L_T$ is equivalent to the torsional fatigue strength exponent.

6. The method according to claim 1, wherein the torsional fatigue test parameters comprise a torsional fatigue strength coefficient and a torsional fatigue strength exponent, and the torsional fatigue test parameters are obtained by:
performing a torsional fatigue test on the to-be-tested material until fatigue failure occurs in the to-be-tested material, and determining a torsional fatigue life of the to-be-tested material;
obtaining a third temperature rise value of the to-be-tested material in a third cycle;
determining third inherent dissipated energy of the to-be-tested material in the third cycle according to the third temperature rise value and the time constant; and
determining the torsional fatigue strength coefficient and the torsional fatigue strength exponent of the to-be-tested material according to the third inherent dissipated energy and the torsional fatigue life.

7. The method according to claim 1, wherein the determining the first inherent dissipated energy according to the time constant and the first temperature rise value comprises:
determining the first inherent dissipated energy according to the first temperature rise value, a second duration of the first cycle, the time constant, a density of the to-be-tested material and a specific heat capacity of the to-be-tested material.

8. The method according to claim 1, wherein the axial fatigue test parameters comprise an axial fatigue strength coefficient and an axial fatigue strength exponent, the torsional fatigue test parameters comprise a torsional fatigue strength coefficient and a torsional fatigue strength exponent, and a formula for calculating the multiaxial fatigue life is:

$$N_{f,p} = \frac{(1-k)}{D_A} \cdot d_{1,cycle}^{1/L_A} + \frac{k}{D_T} \cdot d_{1,cycle}^{1/L_T}$$

wherein, $N_{f,p}$ is the multiaxial fatigue life, $d_{1,\,cycle}$ is the first inherent dissipated energy, k is a weight coefficient, and k is a specific value is determined by the ratio of the axial strain amplitude to the torsional strain amplitude of the multiaxial fatigue test, $D_A$ is equivalent to the axial fatigue strength coefficient, $D_T$ is equivalent to the torsional fatigue strength coefficient, $L_A$ is equivalent to the axial fatigue strength exponent, and $L_T$ is equivalent to the torsional fatigue strength exponent.

9. An electronic device, comprising:
a memory, storing a computer program thereon; and
a processor, configured to execute the computer program in the memory so as to:
obtain a first temperature rise value of a to-be-tested material in a first cycle;
determine first inherent dissipated energy of the to-be-tested material in the first cycle according to the first temperature rise value and a time constant;
determine a multiaxial fatigue life of the to-be-tested material according to a first proportional value, the first inherent dissipated energy, axial fatigue test parameters and torsional fatigue test parameters; wherein the first proportional value is a ratio of an axial strain amplitude to a torsional strain amplitude of a multiaxial fatigue test, the axial fatigue test parameters are configured to represent an axial fatigue resistance of the to-be-tested material, and the torsional fatigue test parameters are configured to represent a torsional fatigue resistance of the to-be-tested material.

10. The electronic device according to claim 9, wherein the axial fatigue test parameters comprise an axial fatigue strength coefficient and an axial fatigue strength exponent, and the processor is further configured to:
perform an axial fatigue test on the to-be-tested material until fatigue failure occurs in the to-be-tested material, and acquire an axial fatigue life of the to-be-tested material;
obtain a second temperature rise value of the to-be-tested material in a second cycle;
determine second inherent dissipated energy of the to-be-tested material in the second cycle according to the second temperature rise value and the time constant; and
determine the axial fatigue strength coefficient and the axial fatigue strength exponent of the to-be-tested material according to the second inherent dissipated energy and the axial fatigue life.

11. The electronic device according to claim 10, wherein the processor is further configured to:
stop performing the axial fatigue test on the to-be-tested material after fatigue failure occurs in the to-be-tested material;
obtain a first duration from fatigue failure occurring in the to-be-tested material to a surface temperature of the to-be-tested material reaching a preset temperature, and within the first duration, determine a corresponding relationship between the temperature rise values of the to-be-tested material and time according to the surface temperature of the to-be-tested material; and
determine the time constant according to the first duration and the corresponding relationship between the temperature rise and time.

12. The electronic device according to claim 9, wherein the torsional fatigue test parameters comprise a torsional fatigue strength coefficient and a torsional fatigue strength exponent, and the processor is further configured to:
perform a torsional fatigue test on the to-be-tested material until fatigue failure occurs in the to-be-tested material, and acquire a torsional fatigue life of the to-be-tested material;
obtain a third temperature rise value of the to-be-tested material in a third cycle;
determine third inherent dissipated energy of the to-be-tested material in the third cycle according to the third temperature rise value and the time constant; and
determine the torsional fatigue strength coefficient and the torsional fatigue strength exponent of the to-be-tested material according to the third inherent dissipated energy and the torsional fatigue life.

13. The electronic device according to claim 9, wherein the processor is configured to:
determine the first inherent dissipated energy according to the first temperature rise value, a second duration of the first cycle, the time constant, a density of the to-be-tested material and a specific heat capacity of the to-be-tested material.

14. The electronic device according to claim 9, wherein the axial fatigue test parameters comprise an axial fatigue strength coefficient and an axial fatigue strength exponent, the torsional fatigue test parameters comprise a torsional fatigue strength coefficient and a torsional fatigue strength exponent, and a formula for calculating the multiaxial fatigue life is:

$$N_{f,p} = \frac{(1-k)}{D_A} \cdot d_{1,cycle}^{1/L_A} + \frac{k}{D_T} \cdot d_{1,cycle}^{1/L_T}$$

wherein, $N_{f,p}$ is the multiaxial fatigue life, $d_{1,\,cycle}$ is the first inherent dissipated energy, k is a weight coefficient, and k is a specific value is determined by the ratio of the axial strain amplitude to the torsional strain amplitude of the multiaxial fatigue test, $D_A$ is equivalent to the axial fatigue strength coefficient, $D_T$ is equivalent to the torsional fatigue strength coefficient, $L_A$ is equivalent to the axial fatigue strength exponent, and $L_T$ is equivalent to the torsional fatigue strength exponent.

15. A non-transitory computer readable storage medium, storing a computer program thereupon, when the computer program in the storage medium is executed by a processor, the processor is caused to:
obtain a first temperature rise value of a to-be-tested material in a first cycle;
determine first inherent dissipated energy of the to-be-tested material in the first cycle according to the first temperature rise value and a time constant;
determine a multiaxial fatigue life of the to-be-tested material according to a first proportional value, the first inherent dissipated energy, axial fatigue test parameters and torsional fatigue test parameters; wherein the first proportional value is a ratio of an axial strain amplitude to a torsional strain amplitude of a multiaxial fatigue test, the axial fatigue test parameters are configured to represent an axial fatigue resistance of the to-be-tested material, and the torsional fatigue test parameters are configured to represent a torsional fatigue resistance of the to-be-tested material.

16. The non-transitory computer readable storage medium according to claim 15, wherein the axial fatigue test parameters comprise an axial fatigue strength coefficient and an axial fatigue strength exponent, and when the computer program in the storage medium is executed by a processor, the processor is further caused to:
perform an axial fatigue test on the to-be-tested material until fatigue failure occurs in the to-be-tested material, and acquire an axial fatigue life of the to-be-tested material;
obtain a second temperature rise value of the to-be-tested material in a second cycle;
determine second inherent dissipated energy of the to-be-tested material in the second cycle according to the second temperature rise value and the time constant; and
determine the axial fatigue strength coefficient and the axial fatigue strength exponent of the to-be-tested material according to the second inherent dissipated energy and the axial fatigue life.

17. The non-transitory computer readable storage medium according to claim 16, when the computer program in the storage medium is executed by a processor, the processor is further caused to:
stop performing the axial fatigue test on the to-be-tested material after fatigue failure occurs in the to-be-tested material;

obtain a first duration from fatigue failure occurring in the to-be-tested material to a surface temperature of the to-be-tested material reaching a preset temperature, and within the first duration, determine a corresponding relationship between the temperature rise values of the to-be-tested material and time according to the surface temperature of the to-be-tested material; and determine the time constant according to the first duration and the corresponding relationship between the temperature rise and time.

18. The non-transitory computer readable storage medium according to claim 15, wherein the torsional fatigue test parameters comprise a torsional fatigue strength coefficient and a torsional fatigue strength exponent, and when the computer program in the storage medium is executed by a processor, the processor is further caused to:
    perform a torsional fatigue test on the to-be-tested material until fatigue failure occurs in the to-be-tested material, and acquire a torsional fatigue life of the to-be-tested material;
    obtain a third temperature rise value of the to-be-tested material in a third cycle;
    determine third inherent dissipated energy of the to-be-tested material in the third cycle according to the third temperature rise value and the time constant; and
    determine the torsional fatigue strength coefficient and the torsional fatigue strength exponent of the to-be-tested material according to the third inherent dissipated energy and the torsional fatigue life.

19. The non-transitory computer readable storage medium according to claim 15, when the computer program in the storage medium is executed by a processor, the processor is caused to:

determine the first inherent dissipated energy according to the first temperature rise value, a second duration of the first cycle, the time constant, a density of the to-be-tested material and a specific heat capacity of the to-be-tested material.

20. The non-transitory computer readable storage medium according to claim 15, wherein the axial fatigue test parameters comprise an axial fatigue strength coefficient and an axial fatigue strength exponent, the torsional fatigue test parameters comprise a torsional fatigue strength coefficient and a torsional fatigue strength exponent, and a formula for calculating the multiaxial fatigue life is:

$$N_{f,p} = \frac{(1-k)}{D_A} \cdot d_{1,cycle}^{1/L_A} + \frac{k}{D_T} \cdot d_{1,cycle}^{1/L_T}$$

wherein, $N_{f,p}$ is the multiaxial fatigue life, $d_{1,\ cycle}$ is the first inherent dissipated energy, k is a weight coefficient, and k is a specific value is determined by the ratio of the axial strain amplitude to the torsional strain amplitude of the multiaxial fatigue test, $D_A$ is equivalent to the axial fatigue strength coefficient, $D_T$ is equivalent to the torsional fatigue strength coefficient, $L_A$ is equivalent to the axial fatigue strength exponent, and $L_T$ is equivalent to the torsional fatigue strength exponent.

* * * * *